Feb. 21, 1956   G. N. FRANKS ET AL   2,735,226
METHOD AND APPARATUS FOR TREATING COTTON SEED
Filed July 28, 1953   2 Sheets-Sheet 1

INVENTORS
GERALD N. FRANKS
CHARLES S. SHAW
BY
R. Hoffman
ATTORNEY

Feb. 21, 1956   G. N. FRANKS ET AL   2,735,226
METHOD AND APPARATUS FOR TREATING COTTON SEED
Filed July 28, 1953   2 Sheets-Sheet 2
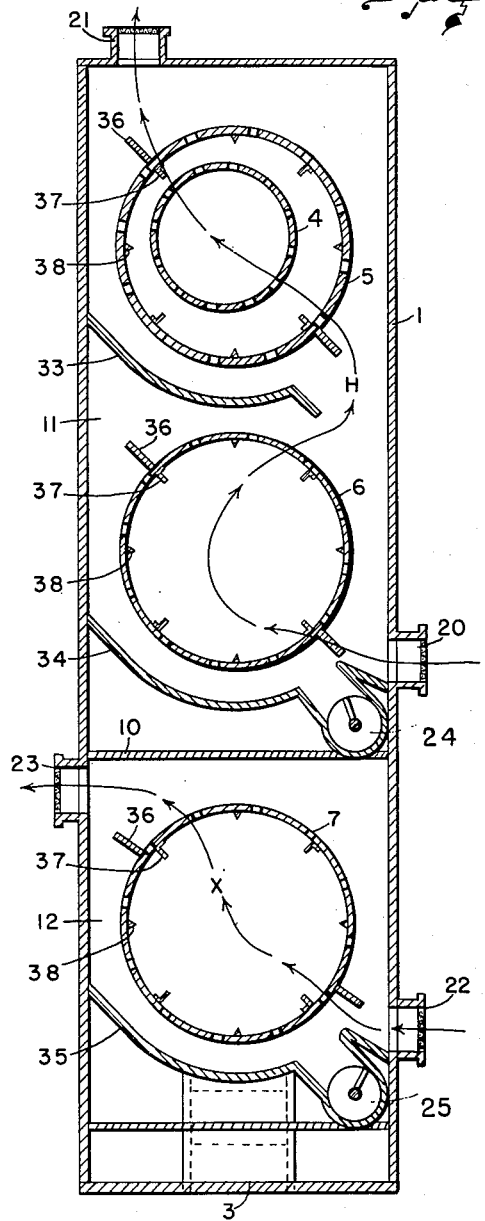
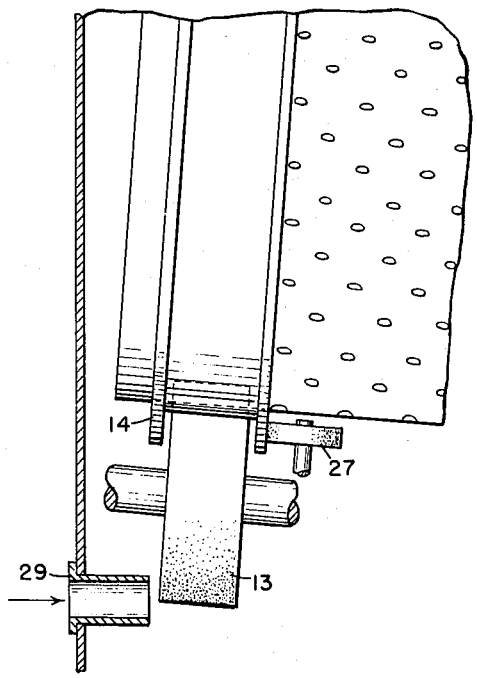
INVENTORS
GERALD N. FRANKS
CHARLES S. SHAW
BY
R. Hoffman
ATTORNEY

United States Patent Office 2,735,226
Patented Feb. 21, 1956

2,735,226

METHOD AND APPARATUS FOR TREATING COTTON SEED

Gerald N. Franks, Greenville, and Charles S. Shaw, Leland, Miss.

Application July 28, 1953, Serial No. 370,902

8 Claims. (Cl. 47—58)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

We hereby dedicate the invention herein described to the free use of the people in the territory of the United States to take effect on the granting of a patent to us.

This invention relates to a method and apparatus for drying, cleaning, and sterilizing cotton seed, and is particularly concerned with such treatment of cotton planting seed to improve its keeping qualities during storage.

The preservation of cotton planting seed in the rain grown regions of the Cotton Belt of the United States of America is frequently endangered by excessive moisture content in the seed at the time of harvesting or at the time of ginning. It has been found that a maximum moisture content of 12.0 percent in cotton planting seed is the upper safe limit for safe storage at all times and for adequate preservation of the germination qualities of the seed. Whether the ultimate use of the cotton seed is for planting or otherwise, it is a vital necessity that this maximum moisture content is not exceeded in order to retard the increase of destructive free fatty acids that ensue rather rapidly above that limit.

One object of this invention, therefore, is to provide an apparatus for drying cotton seed to a moisture content of less than 12% that can be used at the cotton gin.

Another object is to provide an apparatus which, during the drying process, will simultaneously sterilize the cotton planting seed to destroy insect infestations.

A still further object is to provide an apparatus which, simultaneously with accomplishing the above two objects, will permanently and thoroughly remove foreign matter, diseased earth particles, ferment-producing green plant parts, and the like.

Other objects will become apparent from the following description of the invention and from the accompanying drawings.

In the drawings:

Figure 2 is a vertical side section taken on line 2—2 in Figure 1; and

Figure 3 is a partial detail showing the external rollers, tracks, and thrust bearings employed in supporting and propelling the inclined foraminous cylinders of our apparatus.

Like reference numerals pertain to like parts throughout the drawings.

Figure 1:
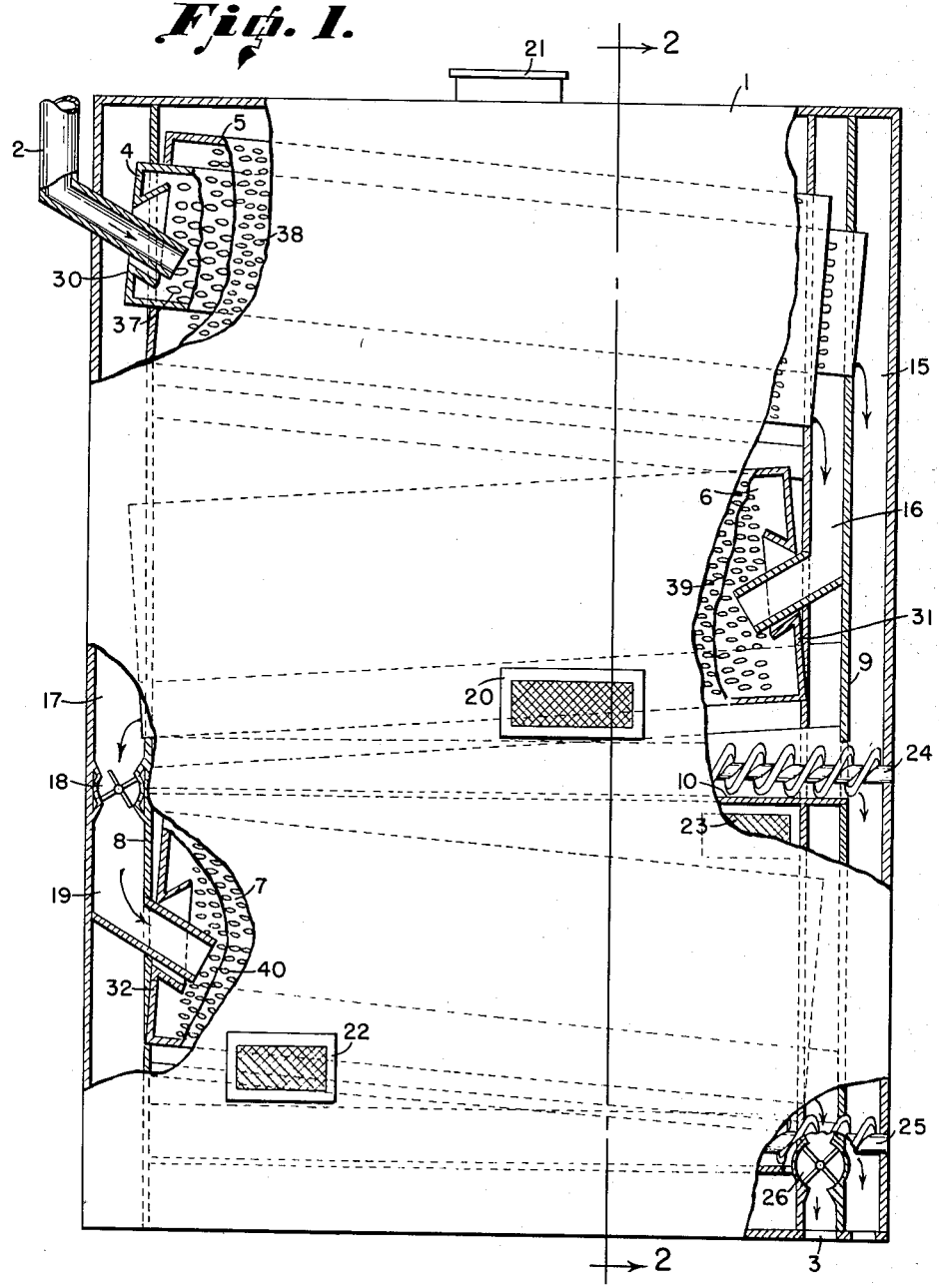
Figure 1 is a front elevation of our apparatus, partly in section, showing the salient features of its construction.

Referring now to the several drawings, it will be seen that the apparatus employed with our method comprises a rectangular box-like casing or chamber 1, having a seed inlet 2 and seed outlet 3 and containing a descending series of revolving foraminous cylinders 4, 5, 6 and 7 having perforations 37, 38, 39, and 40, respectively. The said casing 1 is also partitioned by left side partition 8 and right side partition 9 through which certain end elements of said cylinders 4, 5, 6 and 7 protrude as shown. A horizontal partition 10 divides the said casing 1 into compartments 11 for cleaning, drying and sterilizing, followed by 12 for cooling and discharge of the seed. Other elements of said casing 1 will be described progressively with the apparatus elements. The foraminous cylinders 4, 5, 6 and 7 are each supported by and revolve upon similar resilient-tread rollers (Fig. 3), in conjunction with cylindrical channel tracks 14 which form sleeves about the said cylinders and are rigidly attached thereto by suitable means not shown.

All foraminous cylinders of our apparatus also have short segments at each end that are non-foraminous in order to confine the flows and screening functions within definite limits. Said cylinders 4, 5, 6 and 7 are fabricated from perforated metal sheets in conventional manner and are joined at their longitudinal seams by conventional means not shown after rolling into cylindrical shape.

Cylinder 4 is provided with perforations that are limited to ⅝-inch diameter because we have found by extensive tests that such perforations are optimum for separating lint clusters or grabbots, together with cotton burs, sticks and stems from the cotton seed. At the lower end of the sloping cylinder 4 we provide a trash chute 15 between outer casing 1 and its right side partition 9. Said cylinder 4 is nested eccentrically within foraminous cylinder 5 which slopes parallel therewith. Cylinders 5, 6 and 7 are all provided with ³⁄₁₆-inch perforations which we have found by extensive tests to be optimum for retaining the seeds within the cylinders while allowing the pin and pepper trash to discharge by gravity through said perforations. Seed chute 16 discharges seed from said cylinder 5 into foraminous cylinder 6 which in turn noses through partition 8 and discharges into chute 17, thence through a sealed wheel 18 level with partition 10 in order to complete the air sealing effect between upper compartment 11 and lower compartment 12. Continuation seed chute 19 spouts the seed from sealed wheel into cooling cylinder 7. Said sealed wheel 18 is conventional in its construction and employs the usual shaft, bearings and blades mounted by the usual means, not shown.

At the lower end of compartment 11 we provide an inlet 20 for admission of heated air and sterilizing gas into said compartment, and at the top we provide suction outlet 21 for the discharge of moisture laden air and vitiated gas. Similarly, in compartment 12 we provide a cooling air inlet 22 and suction outlet 23. Compartments 11 and 12 also are provided with conventional trash augers 24 and 25 respectively that are powered by practical means not shown.

Damp seed gravitates from inlet 2 under controlled rates of flow, from a suitable source, not shown, into the first foraminous cylinder 4 where coarse trash of various kinds is separated from the seed and discharged into chute 15, while the seeds pass through the coarse holes of the cylinder 4 by gravity and are then handled within the confines of foraminous cylinder 5 which begins to clean them during their passage through said cylinder 5. During this passage we effectuate a satisfactory warming of the seed with a modicum of drying that usually comprises removal of external moisture from the linters on the seed. This treatment however, does not destroy the linters, or fibers, on the seed. Thereafter, in the passage through cylinder 6 we enjoy full temperature effects for both drying and seed sterilization, whereby we may handle up to 100 pounds of seed per minute to accommodate the average 5/90 cotton gin and, at the same time, comply with State and Federal regulations in drying and sterilizing.

For the discharge of treated and cooled seed we provide hopper 3 and sealed wheel 26.

Reference to Figures 2 and 3 inclusive will disclose some of the novel features of construction in our apparatus that are not disclosed in Figure 1.

Each of the foraminous cylinders 4, 5, 6 and 7 are provided with channel tracks 14 (Fig. 3), within which resilient-tread rollers 13 provide both support and propulsion for said cylinders. Said rollers 13 are powered through conventional shafts and bearings not shown. The slope of all cylinders in our apparatus is customarily arranged so that there is an incline of 7 inches drop in the full length of each cylinder. To provide additional support against down-hill slip of the cylinders, we utilize thrust rollers 27 that are trunnioned and anchored to the casing 1 by practical means not here described.

To obtain satisfactory friction propulsion of said cylinders 4, 5, 6 and 7 by means of the driving resilient-tread rollers 13, we draw external cool air over their surfaces as shown in Figure 3. A unique feature of our apparatus is that both compartments 11 and 12 operate at lower barometric pressures than the external atmosphere by applying suction to outlets 21 and 23, whereby the induction of cooling air for our resilient-treads 28 of rollers 13 through ports 29 is accomplished.

Reference to Figure 1 will disclose the unique cylinder heads, 30, 31 and 32 that we employ for sealing the upper ends of said foraminous cylinders 4, 6 and 7, whereby seed may be delivered into each cylinder without overflow losses at points of entrance.

Reference to Figure 2 will further disclose our employment of semi-cylindrical aprons 33, 34 and 35 placed near the lower surfaces of said cylinders for better channelization of air and gas currents. Said aprons are rigidly attached and positioned within the compartments 11 and 12 by practical means not shown, and they serve a further useful purpose as shelves upon which trash may collect beneath the cylinders and be wiped off by wiper blades 36 that are rigidly attached to said cylinders 5, 6 and 7. A series of short angular and pointed baffles 37 and 38, respectively, are provided in cylinders 5, 6 and 7 to prevent compacting of the contents and insure adequate air circulation.

In Figure 2 we have designated the general flow of air and gas currents by conventional arrows H for the upper compartment 11, and X for the lower compartment 12.

It should be noted that with 5,000 cu. ft. per min. of heated air we attain a body heat within the seed of not more than 140° F. when we are processing planting cotton seed, but when we encounter hardy seed that does not require protection of germination, we are enabled to utilize higher temperatures to meet the exigencies of any situation in high moisture content and insect quarantine requirements.

It should be further noted that in this combination drying-cleaning-sterilizing and cooling method for processing cotton planting seed, we have a unique apparatus that operates at lower barometric pressures than those prevailing in the contiguous external atmosphere, and that we attain a significant vaporization of some moisture thereby. Further, we are enabled by this all-suction system to induce cooling currents of air to our friction driving surfaces; and by this all-suction system we are enabled to minimize external dust discharges and health hazards to the operators.

We claim:

1. A method for treating cotton planting seed to improve its storage qualities without destroying the fibres on said seed which comprises passing the seed stepwise countercurrent to a stream of heated air and sterilizing gas of progressively increasing temperature, said temperature at its maximum being sufficient to dry the seed to a maximum of 12% moisture content but insufficient to destroy the germinating ability of the seed; removing solid impurities of decreasing coarseness at each successive step; and then passing the seed countercurrent to a stream of cooling air.

2. Apparatus for cleaning, drying, and sterilizing cotton planting seed without destroying the fibres on said seed comprising a chamber having an upper and a lower compartment sealed from each other; inclined foraminous cylinders rotatably mounted in said compartments; seed inlet means at the top of the upper compartment; means for transferring seed from one cylinder to a cylinder directly below it; means between said upper and lower compartment to permit transfer of seed from the upper to the lower compartment without passage of gases between said compartments; seed removal means at the bottom of the lower compartment; inlet and exhaust means for supplying heated air and sterilizing gas to the upper compartment and removing exhausted gases therefrom; and inlet and exhaust means for supplying cold air and removing the same from the lower compartment.

3. Apparatus for cleaning, drying, and sterilizing cotton planting seed comprising a chamber having an upper and a lower compartment sealed from each other; the upper compartment having rotatably mounted therein a first inclined foraminous cylinder; a second inclined foraminous cylinder rotatably mounted within the first cylinder, the axes of the two cylinders being parallel but not coincident; a third inclined rotatably mounted foraminous cylinder in the upper compartment disposed directly beneath the outer of the first two cylinders; a fourth inclined rotatably mounted foraminous cylinder in the lower sealed compartment; seed inlet means for supplying untreated seed to the inner of the first two cylinders in the upper compartment; means for affecting successive transfer of seed from the uppermost to the lowermost cylinder; means for removing treated seed from the bottom of the apparatus; inlet and exhaust means for supplying heated air and sterilizing gas to the upper compartment and removing exhausted gases therefrom; and inlet and exhaust means for supplying cold air and removing the same from the lower compartment.

4. Apparatus as in claim 3 in which the perforations in the inner of the upper two cylinders are large enough to pass cotton seed, while the perforations in all of the remaining cylinders are of smaller diameter than cotton seed.

5. Apparatus as in claim 3 in which the inner of the upper two inclined cylinders is longer than the outer cylinder and extends beyond the lower end thereof.

6. Apparatus as in claim 3 in which the means for successively transferring seed from an upper cylinder to a lower cylinder comprise chutes communicating between the lower end of an upper cylinder and the upper end of a next succeeding lower cylinder, the chute communicating between the lowest cylinder in the upper compartment and the cylinder in the lower compartment being provided with means to permit passage of seed but preventing the passage of air between the two compartments.

7. The apparatus of claim 3 further comprising concentric aprons disposed beneath each cylinder, scraper means rigidly mounted on the outside of the cylinders contacting said aprons, and conveyor means mounted in troughs at the lower end of each apron.

8. The apparatus of claim 3 further comprising channel tracks rigidly mounted at the ends of each cylinder, resilient treaded wheels supporting and driving the cylinders on said tracks; thrust bearings in contact with a lower face of said track; and cold air inlet means in the apparatus frame disposed adjacent said resilient treaded wheels.

References Cited in the file of this patent

UNITED STATES PATENTS

| Number | Name | Date |
|---|---|---|
| 112,628 | Powers | Mar. 14, 1871 |
| 273,900 | Shepard | Mar. 13, 1883 |
| 297,761 | Case | Apr. 29, 1884 |
| 513,973 | Aulmann | Feb. 6, 1894 |
| 726,805 | Verrell | Apr. 28, 1903 |
| 2,515,725 | McLemore | July 18, 1950 |
| 2,537,186 | Everett | Jan. 9, 1951 |
| 2,571,095 | Altschul et al. | Oct. 16, 1951 |

FOREIGN PATENTS

| Number | Country | Date |
|---|---|---|
| 124,614 | Germany | Oct. 31, 1901 |